(12) United States Patent
Ishihara et al.

(10) Patent No.: US 7,950,494 B2
(45) Date of Patent: May 31, 2011

(54) TORQUE DETECTING DEVICE AND ELECTRIC POWER STEERING APPARATUS USING THE SAME

(75) Inventors: Toshiharu Ishihara, Kashiba (JP); Yoshitomo Tokumoto, Nabari (JP); Naoki Nakane, Toyota (JP)

(73) Assignees: JTEKT Corporation, Osaka-shi, Osaka (JP); Denso Corporation, Kariya-shi, Aichi (JP)

( * ) Notice: Subject to any disclaimer, the term of this patent is extended or adjusted under 35 U.S.C. 154(b) by 367 days.

(21) Appl. No.: 11/992,829

(22) PCT Filed: Sep. 27, 2006

(86) PCT No.: PCT/JP2006/319136
§ 371 (c)(1),
(2), (4) Date: Mar. 28, 2008

(87) PCT Pub. No.: WO2007/040109
PCT Pub. Date: Apr. 12, 2007

(65) Prior Publication Data
US 2009/0057051 A1    Mar. 5, 2009

(30) Foreign Application Priority Data
Sep. 30, 2005 (JP) ................................. 2005-288509

(51) Int. Cl.
*B62D 5/04* (2006.01)
*G01L 3/10* (2006.01)
(52) U.S. Cl. ............... 180/444; 73/862.331; 73/863.333
(58) Field of Classification Search .................. 180/444; 73/862.08, 862.321, 862.331, 862.333
See application file for complete search history.

(56) References Cited

U.S. PATENT DOCUMENTS

| | | | |
|---|---|---|---|
| 4,376,053 A | | 3/1983 | Bullock et al. |
| 5,195,382 A | * | 3/1993 | Peilloud .................... 73/862.321 |
| 5,578,767 A | * | 11/1996 | Chikaraishi et al. ...... 73/862.331 |
| 5,811,695 A | * | 9/1998 | Satoh et al. ............... 73/862.331 |
| 6,301,975 B1 | * | 10/2001 | Chikaraishi ............... 73/862.331 |
| 6,370,966 B1 | * | 4/2002 | Naruse et al. .............. 73/862.08 |
| 6,644,134 B2 | * | 11/2003 | Laidlaw et al. ........... 73/862.331 |
| 6,880,411 B2 | | 4/2005 | Nakane et al. |
| 6,988,422 B2 | * | 1/2006 | Sugimura et al. ......... 73/862.334 |
| 7,047,824 B2 | | 5/2006 | Nakane et al. |

(Continued)

FOREIGN PATENT DOCUMENTS
JP       55-041896 A      3/1980
(Continued)

*Primary Examiner* — Joanne Silbermann
*Assistant Examiner* — Daniel Yeagley
(74) *Attorney, Agent, or Firm* — Birch, Stewart, Kolasch & Birch, LLP

(57) ABSTRACT

There is provided a torque detecting device including: magnetic flux concentrating rings which locate on a magnetic circuit forming member provided in a rotating body to which a torque is exerted, the rings concentrating a magnetic flux generated by the member; a detecting part which detects the torque to the rotating body based on a density of the magnetic flux concentrated by the rings; and a holding ring which holds the magnetic flux concentrating rings and the detecting part and includes an attachment portion attaching to a stationary substance, on a circumference of the holding ring. Both end faces of the holding ring in an axial direction of the holding ring are substantially parallel. The attachment portion includes a fitting groove into which a sealing ring, which seals a gap between the attachment portion and the stationary substance, fits.

4 Claims, 10 Drawing Sheets

U.S. PATENT DOCUMENTS

| | | |
|---|---|---|
| 7,089,809 B2 | 8/2006 | Nakane et al. |
| 7,428,847 B2 * | 9/2008 | Osuka et al. ............. 73/862.331 |
| 7,509,883 B2 * | 3/2009 | Murakami et al. ....... 73/862.331 |
| 2003/0042065 A1 | 3/2003 | Maekawa |
| 2003/0167857 A1 | 9/2003 | Sugimura et al. |
| 2005/0223820 A1 | 10/2005 | Murakami et al. |
| 2005/0247139 A1* | 11/2005 | Sugimura et al. ........ 73/862.331 |
| 2006/0021451 A1* | 2/2006 | Ishihara et al. .......... 73/862.331 |
| 2009/0241693 A1* | 10/2009 | Maehara .................. 73/862.333 |
| 2010/0147620 A1* | 6/2010 | Ishihara et al. ............... 180/443 |

FOREIGN PATENT DOCUMENTS

| | | | | |
|---|---|---|---|---|
| JP | 10258749 A | * | 9/1998 | |
| JP | 10-297507 A | | 11/1998 | |
| JP | 10324252 A | * | 12/1998 | |
| JP | 11-248561 A | | 9/1999 | |
| JP | 11248564 A | * | 9/1999 | |
| JP | 2000310646 A | * | 11/2000 | |
| JP | 2003-72566 A | | 3/2003 | |
| JP | 2003-149062 A | | 5/2003 | |
| JP | 2003-329523 A | | 11/2003 | |
| JP | 2004-219340 A | | 8/2004 | |
| JP | 2005-226994 A | | 8/2005 | |
| JP | 2005-265581 A | | 9/2005 | |
| JP | 2005-265587 A | | 9/2005 | |
| JP | 2005-300267 A | | 10/2005 | |
| JP | 2006-71326 A | | 3/2006 | |
| JP | 2007187589 A | * | 7/2007 | |

* cited by examiner

TORQUE DETECTING DEVICE AND ELECTRIC POWER STEERING APPARATUS USING THE SAME

This application is national phase under 35 U.S.C. §371 of PCT International Application No. PCT/JP2006/319136 which has an international filing date of Sep. 27, 2006 and designated the United State of America.

BACKGROUND

1. Technical Field

The present invention relates to: a torque detecting device which detects a torque exerted to a rotating body; and an electric power steering apparatus including the torque detecting device and an electric motor for assisting a steering operation.

2. Description of Related Art

A torque detecting device is, for example, described in Patent Document 1. The torque detecting device of the Patent Document 1 includes a magnetic circuit forming member provided on a rotating body having an input shaft and an output shaft which connect to each other via a torsion bar. The device also includes two magnetic flux concentrating rings that concentrate a magnetic flux generated by the magnetic circuit forming member. The two rings locate parallel to each other in an axial direction of the shafts and locate outside an outer circumference of the magnetic circuit forming member, being apart from each other. The device also includes a detecting part that detects a torque, which is exerted to the rotating body, based on a density of the magnetic flux which the rings concentrate.

The above-mentioned torque detecting device is mounted, for example, on an electric power steering apparatus for a vehicle. The electric power steering apparatus includes the rotating body whose input shaft connects to a steering wheel. The apparatus also includes a tubular housing that accommodates the rotating body to support it. The apparatus also includes an electric motor for assisting a steering operation, which connects to the output shaft via a reduction mechanism. The apparatus also includes a controlling part having a microprocessor and coupled to the detecting part and a driving circuit of the electric motor. Based on a torsion arising in the torsion bar, the detecting part detects the torque exerted to the input shaft upon the steering operation of the steering wheel. The electric motor is controlled to be driven based on the detected torque.

In addition, when the torque detecting device is mounted on the housing, the torque detecting device as a whole is inserted into an interior from one end of the housing and is fixed in the interior of the housing.

[Patent Document 1] Japanese Patent Application Laid-Open No. 2003-149062

SUMMARY

Problems to be Solved by the Invention

However, in the torque detecting device of the Patent Document 1, a whole of the torque detecting device is inserted into the interior of the housing. Further, the device is fixed in the interior of the housing. Therefore, it is rather difficult to perform a fixing operation in which the torque detecting device is to be fixed at a precise position in an appropriate posture inside the housing. Thus, improvements have been desired.

FIG. 10 is a partially enlarged cross-sectional view of an electric power steering apparatus including an improved torque detecting device. As shown in the figure, the applicant has developed the torque detecting device including a holding ring 105. The holding ring has a ring part 102 retaining a magnetic flux concentrating ring 100 and a detecting part 101. The holding ring also has an attachment part 103 projected in one radial direction of the ring part 102. The holding ring also has a flange 104 circumferentially provided on a tip end of the attachment part 103. A housing 106 of the electric power steering apparatus includes a through hole 107 that penetrates through the housing 106 in a radial direction. The housing 106 also includes an annular grove 108 that communicates with an edge of the through hole 107. An O-ring 109 is fitted in the annular groove 108. The torque detecting device is inserted in the housing 106 through the through hole 107 in the radial direction. Then, after the flange 104 pinches the O-ring 109 in the annular groove 108, the flange 104 is fixed on the housing 106 using tiny screws.

In such configurations, the fixing operation of the torque detecting device is improved. On the other hand, the flange 104, which is annular, projects on the attachment part 103 of the holding ring 105. Therefore, the holding ring 105 becomes bulkier and this may disturb easier transportation of a plurality of the devices and/or compact packaging of them. In addition, a dimension of the housing 106 in the axial direction becomes longer by a dimension of such a flange 104. Even in the case where the electric power steering apparatus has a steering column capable of absorbing secondary impact energy mounted on the housing 106, the apparatus suffers from shortening of an energy absorption stroke by the dimension of the flange 104.

It is preferred to secure the longer energy absorption stroke as long as possible, because safety in crash can be rendered much higher in case of head-on crash. On the other hand, mounting positions of the electric power steering apparatus on vehicle bodies necessarily depend on respective vehicle types. There is a system in which the secondary impact energy is absorbed by displacement of an upper column relative to a lower column where the upper column slidably fits to the lower column in the axial direction and the lower column fits to one end of the housing 106 to fix it. In the system, the longer the dimension of the housing 106 in the axial direction becomes, the shorter a displacement amount (the energy absorption stroke) of the upper column relative to the lower column becomes.

A chief object is to provide: a torque detecting device whose profile can be reduced for making transportation of a plurality of the devices easier and making packaging of them more compact; and an electric power steering apparatus in which the energy absorption stroke can be made far longer.

Means for Solving the Problems

There is provided a torque detecting device according to a first aspect, comprising: magnetic flux concentrating rings which locate outside of a circumference of a magnetic circuit forming member provided in a rotating body to which a torque is exerted, the rings concentrating a magnetic flux generated by the magnetic circuit forming member; a detecting part which detects the torque exerted to the rotating body based on a density of the magnetic flux concentrated by the rings; and a holding ring which holds the magnetic flux concentrating rings and the detecting part and includes an attachment part, which attaches to a stationary substance, on an outer circumference of the holding ring, wherein both end faces of the holding ring in an axial direction of the holding ring are substantially parallel to each other, and the attachment part includes a fitting groove in which a sealing ring, which seals a gap between the attachment part and the stationary substance, fits.

There is provided a torque detecting device according to a second aspect, wherein the attachment part is provided with a flange between the both end faces.

There is provided an electric power steering apparatus according to a third aspect, comprising: the torque detecting device according to the first and/or second aspects; a housing which includes a through hole penetrating a circular tubular part, which accommodates the rotating body to fix it, in a radial direction and allows the holding ring to be fitted through the through hole therein, the attachment part attaching to the housing; a steering operation shaft which connects to the rotating body; a controlling part which drives an electric motor for assisting a steering operation, based on the torque detected by the torque detecting device; and transmitting means which transmits a rotating force of the electric motor to a steering mechanism.

There is provided an electric power steering apparatus according to a fourth aspect, further comprising: an upper column which connects to a steering operation member; and a lower column which fits to the upper column relative to which the lower column is capable of displacement in an axial direction thereof, a lower end of the lower column fitting to one end of the housing to be fixed, wherein the upper column and the lower column accommodates the steering operation shaft.

EFFECTS OF THE INVENTION

According to the first aspect, both end faces of the holding ring having the attachment part in an axial direction of the holding ring are substantially parallel to each other, and the attachment part that includes both end faces includes a fitting groove in which a sealing ring, which seals a gap between the attachment part and the stationary substance, fits. Therefore, the profile of the holding ring can be reduced. Thus, even a plurality of the holding rings can be transported easily and packaged compactly.

According to the second aspect, even though both end faces of the holding ring in an axial direction of the holding ring are substantially parallel to each other, a flange between the both end faces allows the holding ring to be fixed easily.

According to the third aspect, a dimension of the housing in the axial direction can be rendered shorter by a dimension of a flange of the holding ring. Therefore, when the steering column that can absorb the secondary impact energy is mounted to the housing, the energy absorption stroke can be rendered longer by the dimension of the flange. Moreover, the holding ring is provided with the fitting groove. Therefore, the fitting groove can be formed in the holding ring during the molding of the holding ring, while the housing has no need for being formed with such a fitting groove. Thus, manufacturing of the housing can cost less.

According to the fourth aspect, the displacement of the lower column relative to the upper column can be rendered longer by the dimension of the flange. Accordingly, safety in crash can be rendered higher due to a resulting longer energy absorption stroke in head-on crash of vehicles.

DESCRIPTION OF THE REFERENCE NUMERALS

Figure 1:
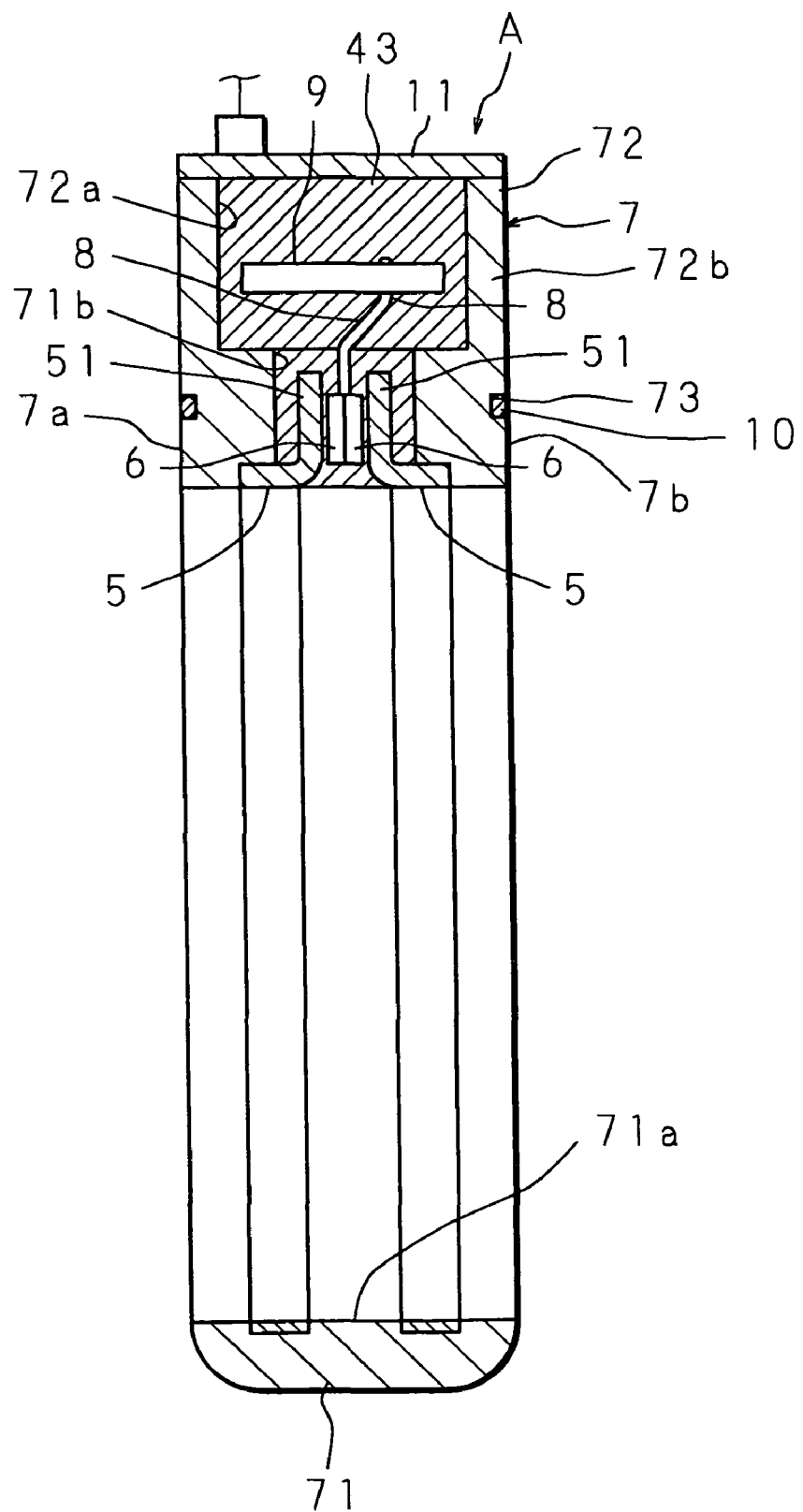
FIG. 1 is a cross-sectional view of a torque detecting device according to one embodiment.

A: a torque detecting device
2: a first rotating body (a rotating body)
3: a second rotating body (a rotating body)
4: a magnet circuit forming member
5: a magnetic flux concentrating ring
6: a detecting part
7: a holding ring
72b: an attachment portion (an attachment part)
72c: a flange
73: a fitting groove
10: a sealing ring
20: a steering operation shaft
21: a force transmitting shaft (force transmitting means)
25: a housing (a stationary substance)
25b: a circular tubular part
25d: a through hole
26: an electric motor
28: a controlling part
29: a lower column
30: an upper column

DETAILED DESCRIPTION

Figure 2:
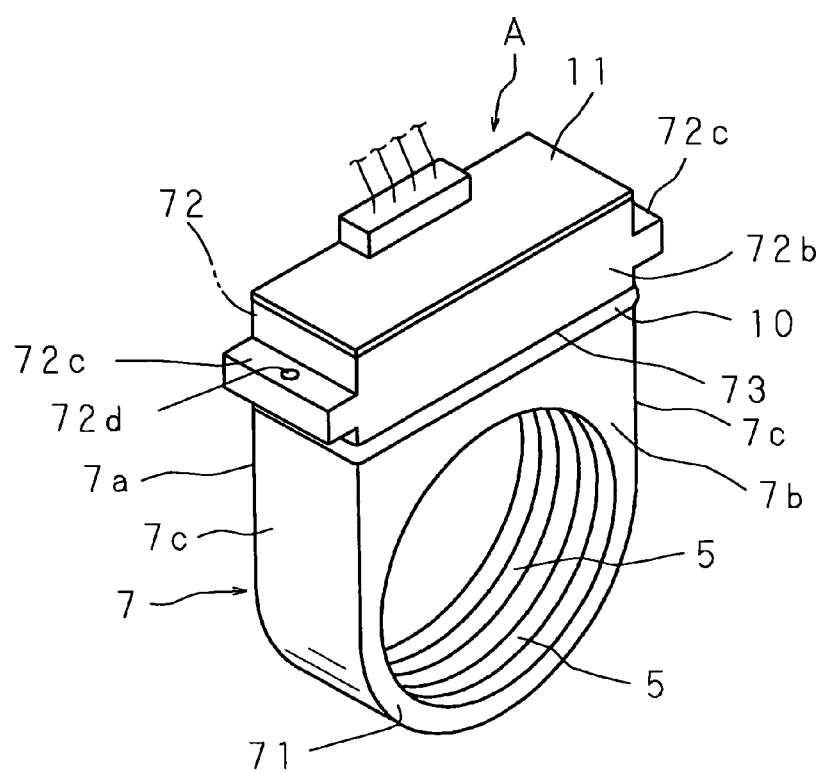
FIG. 2 is a perspective view of the torque detecting device according to the embodiment.
Figure 3:
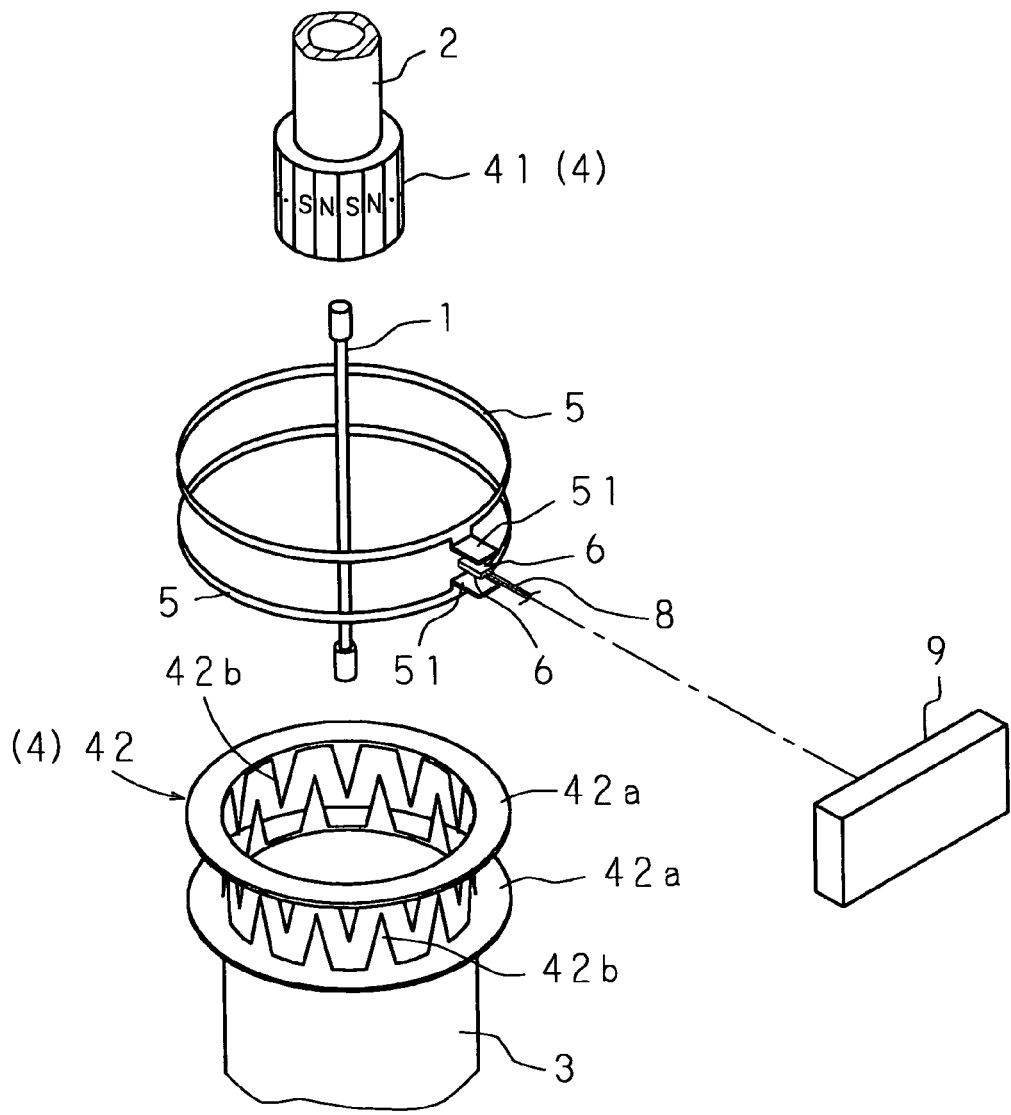
FIG. 3 is a schematic exploded perspective view of the torque detecting device according to the embodiment.
Figure 4:
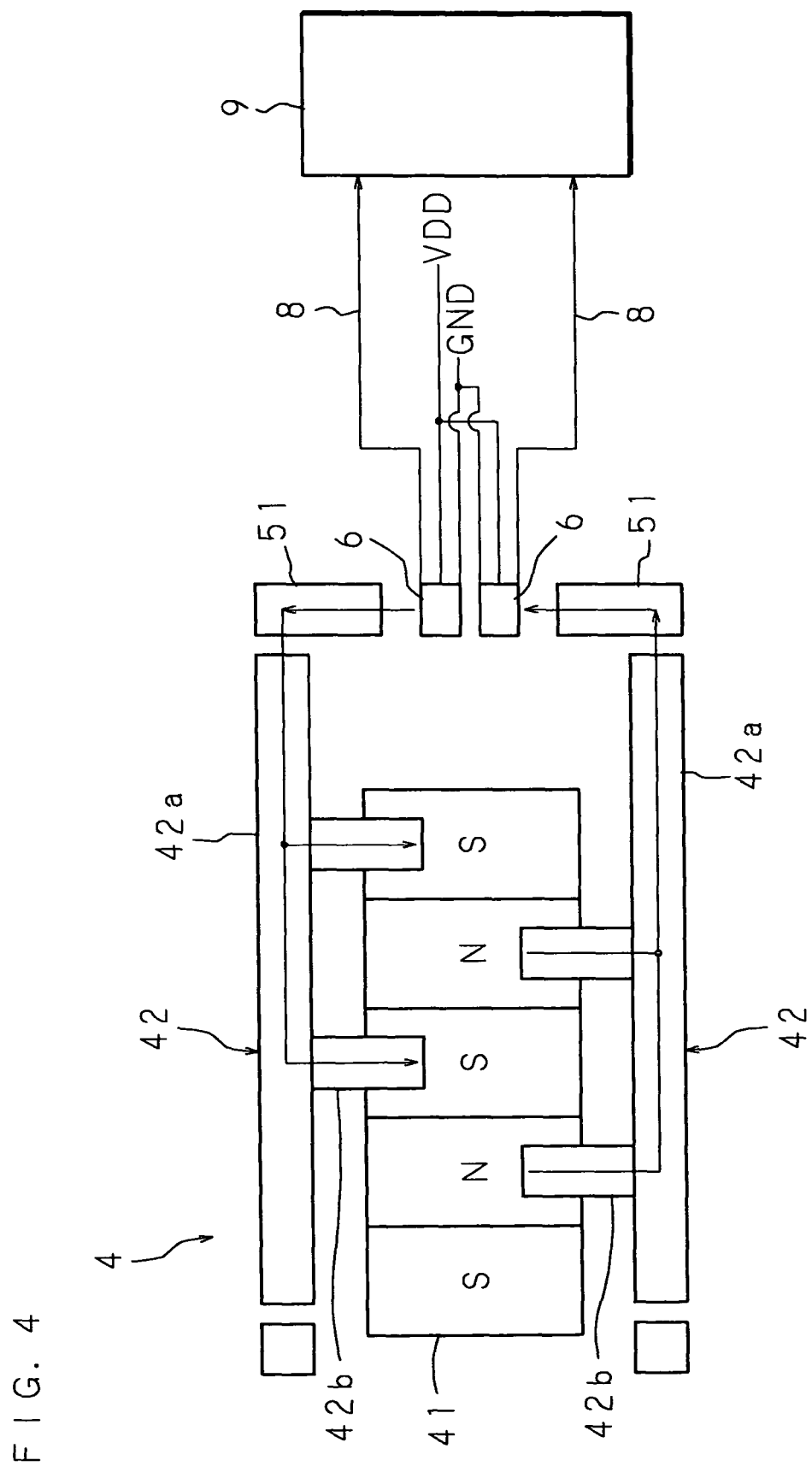
FIG. 4 is a diagram illustrating a magnetic circuit which generates in a case that a rotating body rotates in one direction.

Hereinafter, with reference to the drawings that show embodiments of the present invention, the present invention will be illustrated in detail. FIG. 1 is a cross-sectional view of a torque detecting device according to one embodiment. FIG. 2 is a perspective view of the torque detecting device. FIG. 3 is a schematic exploded perspective view. FIG. 4 is a diagram illustrating a magnetic circuit which generates in a case that a rotating body rotates in one direction.

A torque detecting device A includes two magnetic flux concentrating rings 5, 5 that concentrates a magnetic flux which a magnetic circuit forming member 4 generates. The two rings 5, 5 are spaced from each other in an axial direction thereof. Also, the two rings 5, 5 circumferentially locate outside the magnetic circuit forming member 4 that a first rotating body 2 and a second rotating body 3 have, which coaxially connect to each other via a torsion bar 1. The device also includes a detecting part 6 that detects a torque exerted to the first rotating body 2 based on a density of the flux concentrated by the magnetic flux concentrating rings 5, 5. The device also having a first housing that includes a holding ring 7 that holds the magnetic flux concentrating rings 5, 5 and the detecting part 6 and has an attachment part for attachment onto a stationary substance such as a second housing 25 in an outer circumference of the holding ring 7. The device also includes a detecting circuit substrate 9 that connects to the detecting part 6 via lead wires 8. Further, the magnetic circuit forming member 4 includes permanent magnets 41 attached to an outer circumference of the first rotating body 2. Also, the magnetic circuit forming member 4 includes two magnetic rings 42, 42 which locate outside the permanent magnets 41 and fit onto the second rotating body 3.

The permanent magnets 41 form a multi-pole magnetized ring that is magnetized alternately with north and south poles in a circumferential direction of the ring. The permanent magnets 41 fit onto the first rotating body 2.

The magnetic rings 42, 42 have two opposing annular plate portions 42a, 42a that separate from each other in an axial direction of the second rotating body 3. The magnetic rings 42, 42 also have comb teeth 42b, 42b that extend toward each other from inner circumferential portions of the annular plate portions 42a, 42a. In the magnetic rings 42, 42, a magnetic flux density between the magnetic rings 42, 42 varies upon their rotation relative to the permanent magnets 41. The comb teeth 42b, 42b intermesh alternately at equal intervals in the circumferential direction. The magnetic rings 42, 42 are molded with a synthetic resin material, where the comb teeth 42b, 42b intermesh alternately to provide a molded body.

The magnetic flux concentrating rings 5, 5 are circular rings that have convex pieces 51, 51. The convex pieces 51, 51 extend radially outward from respective circumferential positions of the magnetic flux concentrating rings 5, 5, and locate on both sides of the detecting part 6. In the magnetic flux concentrating rings 5, 5, the magnetic flux gathers in the convex pieces 51, 51. Furthermore, the magnetic flux concentrating rings 5, 5 are made of a processed magnetic plate such as a steel plate.

The holding ring 7 includes a ring part 71 having a through hole 71a corresponding to an inner circumferential face of the magnetic flux concentrating rings 5, 5. The holding ring 7 also includes a polygonal cylinder portion 72, which is provided with a bottom, extending radially outward from a circumferential portion of the ring part 71 and having an accommodating portion 72a and an attachment portion 72b. They are molded with a synthetic resin material. In a circumferential portion of the polygonal cylinder part 72, the attachment portion 72b has flanges 72c, 72c.

Both end faces 7a, 7b of the holding ring 7 in an axial direction of the holding ring 7 are substantially parallel to each other, forming flat planes, and are not provided thereon with a certain convex portion such as a tip, boss, bank, bump and lump. A circumferential surface of the holding ring 7, which intervenes between the both end surfaces 7a, 7b, has a substantial U shape. The flanges 72c, 72c project at both end portions of the circumferential surface in a circumferential direction, in other words, at both side surface portions 7c, 7c between the both end surfaces 7a, 7b. The flanges 72c, 72c include insertion holes 72d, 72d through which tiny screws are to be inserted. An annular fitting groove 73 is provided along a whole circumference around the attachment portion 72b including a vicinity of base portions of the flanges 72c, 72c. A sealing ring 10 fits into the fitting groove 73. The sealing ring 10 consists of an O-ring for sealing a gap between the attachment portion 72b and the stationary substance. In addition, the fitting groove 73 is formed when molding the holding ring 7.

The through hole 71a communicates with the accommodating portion 72a via a communication hole 71b. The magnetic flux concentrating rings 5, 5 fit into the ring part 71 to be fixed on an inner circumference of the ring part 71. The convex pieces 51, 51 of the magnetic flux concentrating rings 5, 5 locate in the communication hole 71b. The detecting circuit substrate 9 is mounted in the accommodating portion 72a with tiny screws. A lid body 11 is mounted on an opening end of the polygonal cylinder part 72, which opens toward outside, with such as tiny screws. Lead wires from the substrate 9 are guided through the lid body 11.

The detecting part 6 includes a Hall element that varies in electric characteristics such as resistance by the action of a magnetic field. The detecting part 6 changes its detection signal in accordance with a change of a density of a magnetic flux that is generated between the convex pieces 51, 51 of the magnet flux concentrating rings 5, 5. The detection signal is sent to the detecting circuit substrate 9. It should be noted that the detecting part 6 might include a magnetic sensing element other than the Hall element. The magnetic sensing element may vary in the electric characteristics such as the resistance by the effect of the magnetic field such as a magnetoresistance effect (MR) element, and is not limited to the Hall element.

Figure 5:
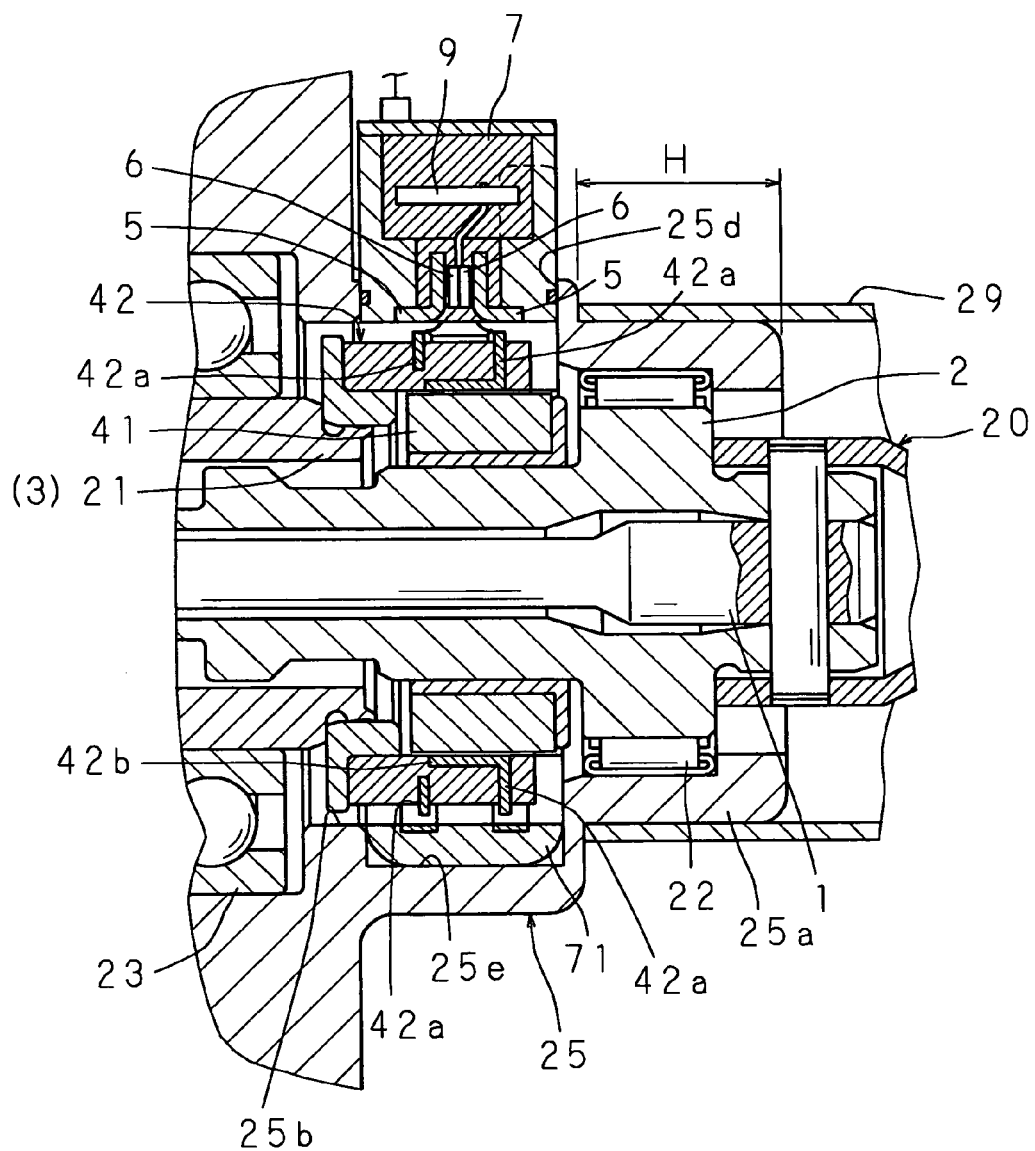
FIG. 5 is a partially enlarged cross-sectional view of an example of an electric power steering apparatus using the torque detecting device.
Figure 6:
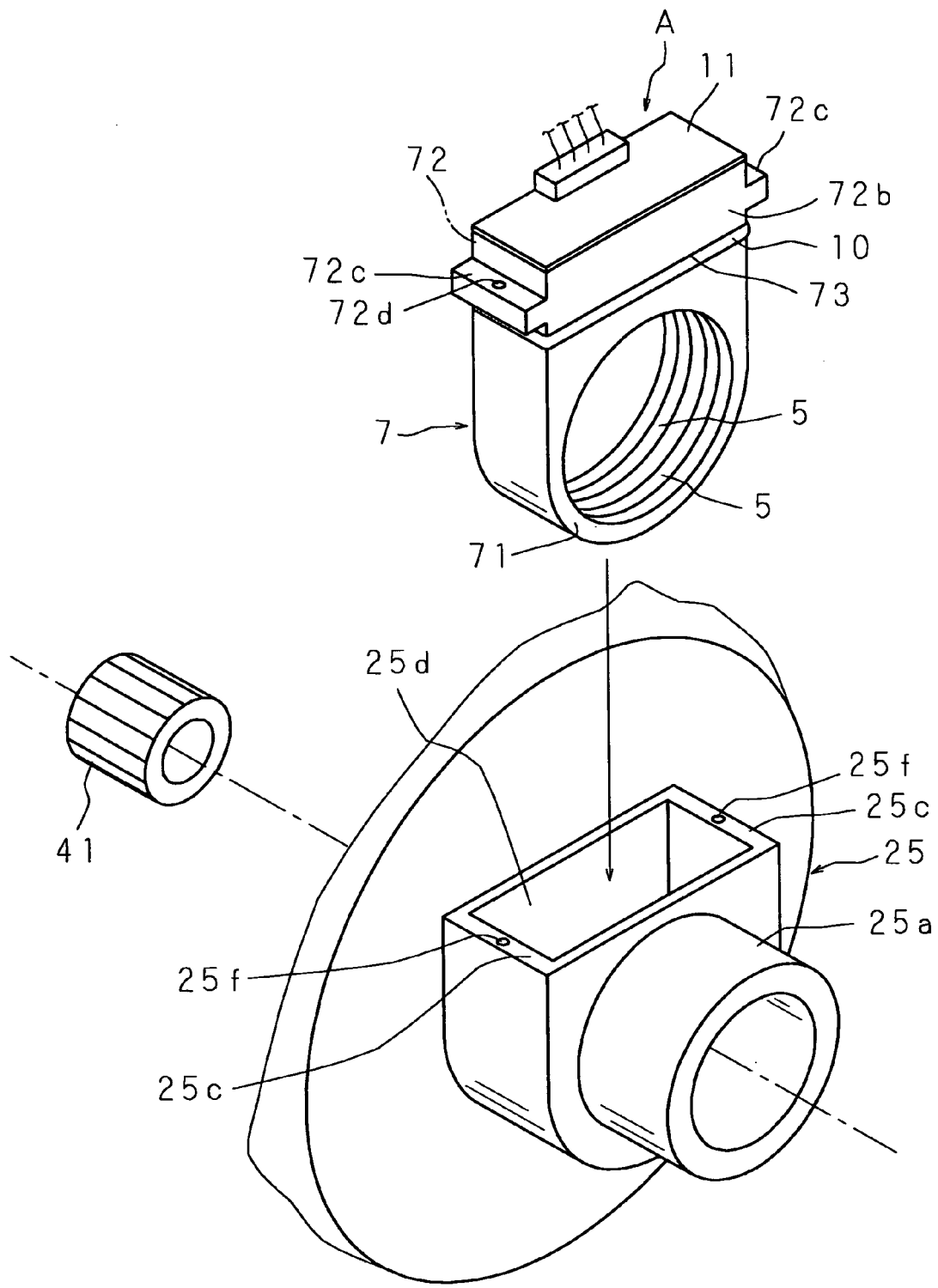
FIG. 6 is a perspective view of relationship of the torque detecting device to a housing.
Figure 7:
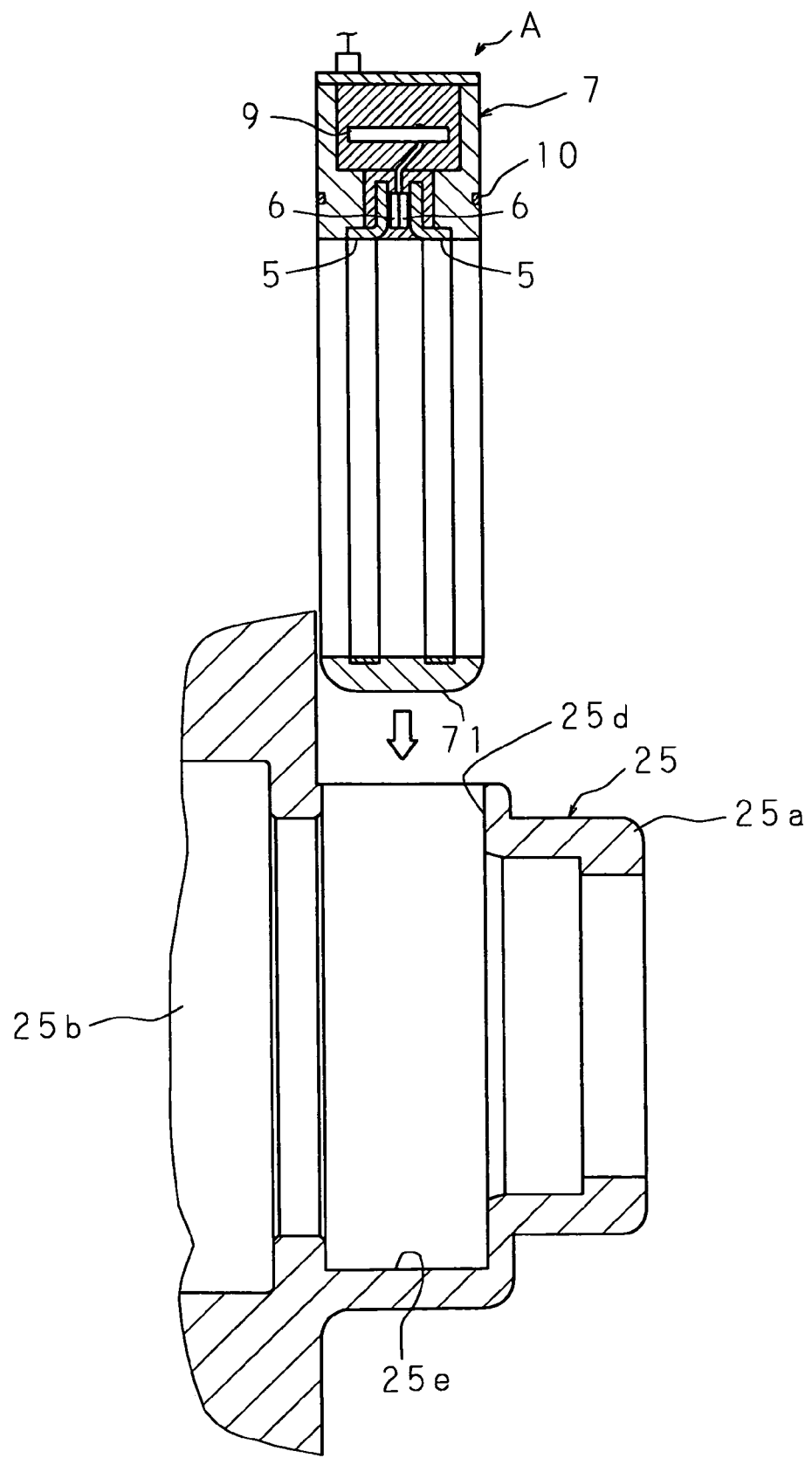
FIG. 7 is a diagram illustrating assembling into the housing.
Figure 8:
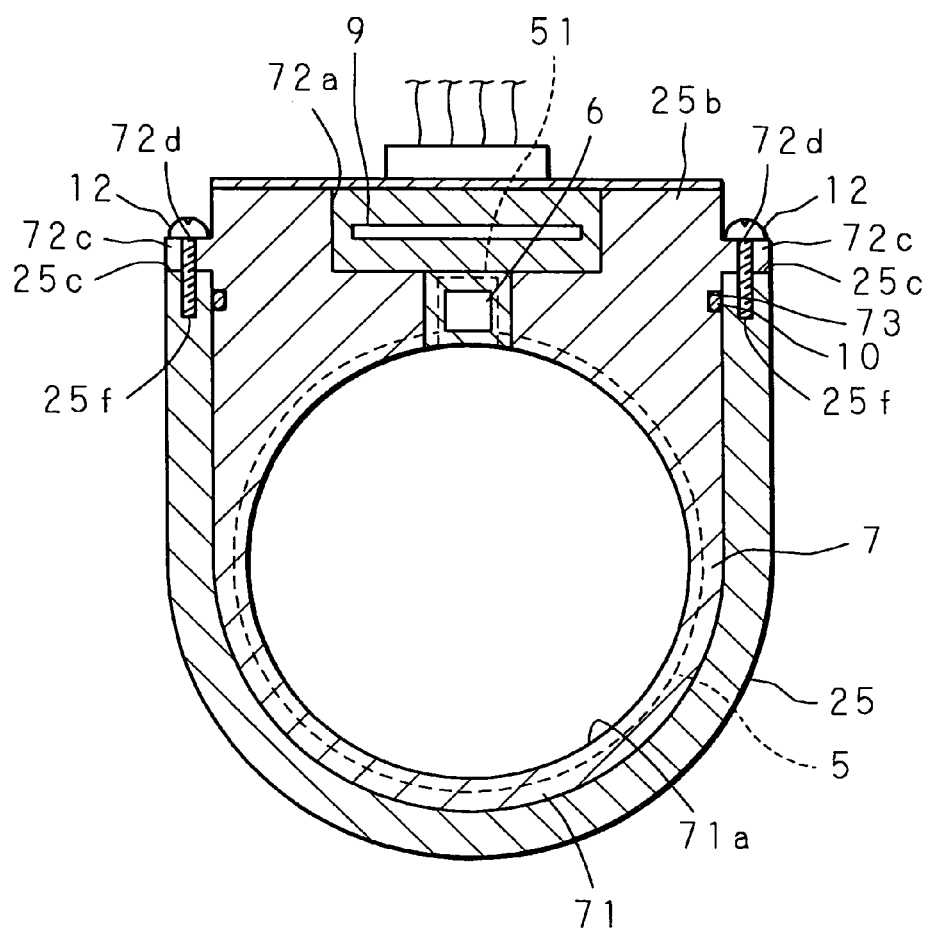
FIG. 8 is a cross-sectional view of a part of the torque detecting device.
Figure 9:
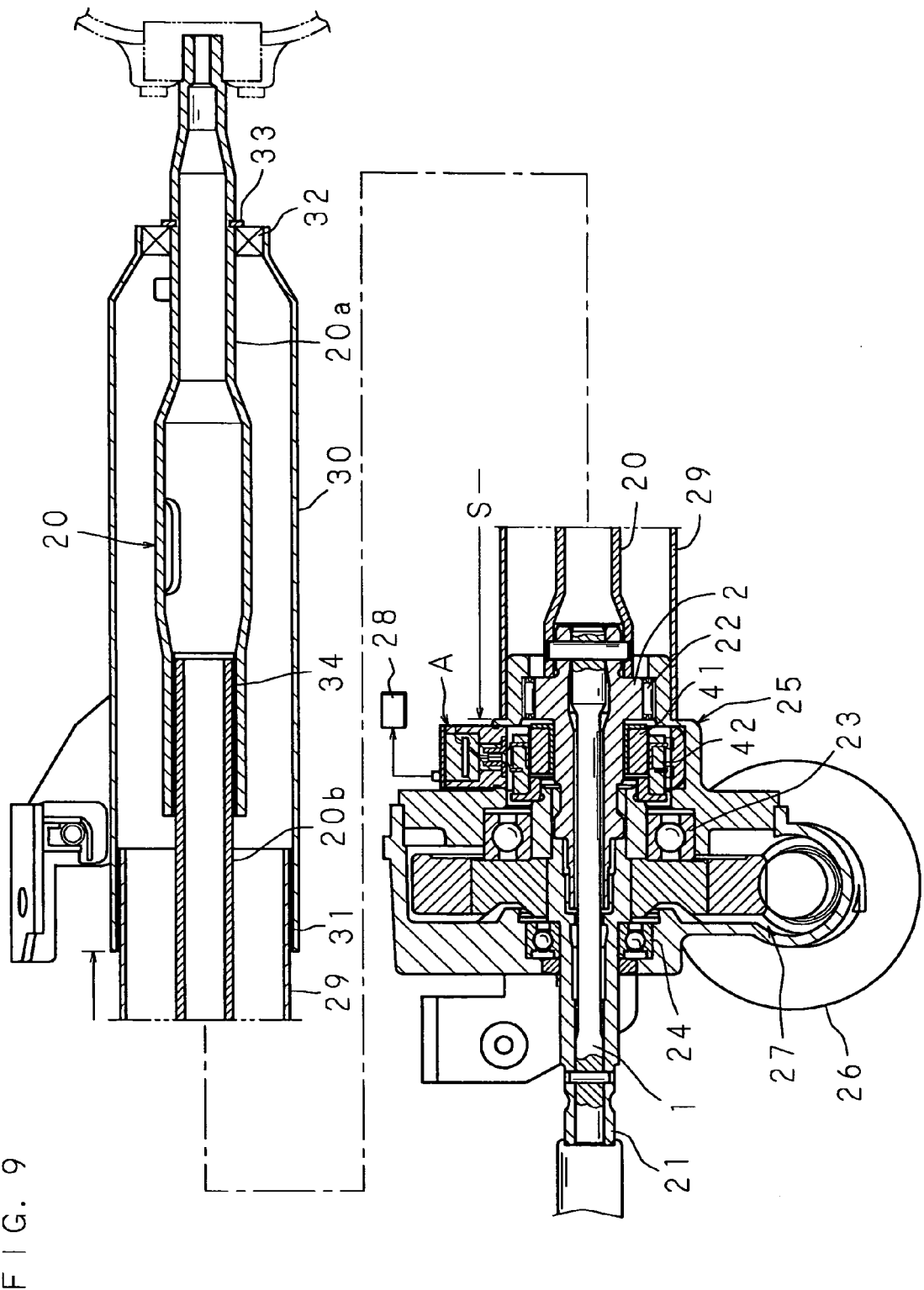
FIG. 9 is a cross-sectional view of an electric power steering apparatus as a whole.
Figure 10:
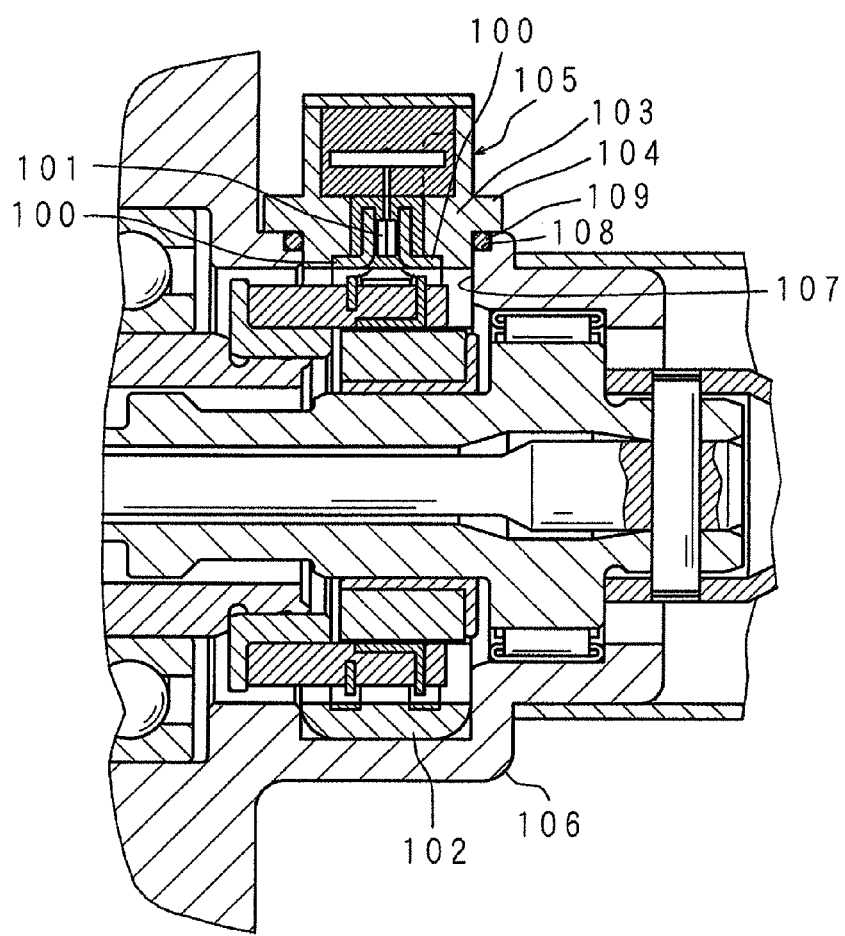
FIG. 10 is a partially enlarged cross-sectional view of a conventional electric power steering apparatus including an improved torque detecting device.

FIG. 5 is a partially enlarged cross-sectional view of an example of an electric power steering apparatus using a torque detecting device. FIG. 6 is a perspective view of relationship of a torque detecting device to a housing. FIG. 7 is a diagram illustrating assembling into a housing. FIG. 8 is a cross-sectional view of a part of a torque detecting device. FIG. 9 is a cross-sectional view of an electric power steering apparatus as a whole.

The torque detecting device A as described above is used for an electric power steering apparatus for a vehicle for example. The electric power steering apparatus includes a force transmitting shaft 21 (the second rotating body 3) that connects coaxially to a steering operation shaft (steering shaft) 20 via the torsion bar 1. The steering operation shaft 20 connects to a steering operation member as a steering wheel at an upper end thereof and connects to the first rotating body 2 at a lower end thereof. The apparatus also includes a housing 25 that surrounds the first rotating body 2 and the force transmitting shaft 21 and includes three bearings 22, 23, 24 rotatably supporting the first rotating body 2 and the force transmitting shaft 21. The apparatus also includes an electric motor for assisting a steering operation attached to the housing 25. The apparatus also includes a reduction mechanism 27 that transmits a rotational force from a driving shaft of the electric motor 26 to an output shaft 21 (the force transmitting shaft 21, the second rotating body 3). The apparatus also includes the torque detecting device A and a controlling part 28 having a microprocessor that is coupled to the detecting circuit substrate 9 of the torque detecting device A and a driving circuit of the electric motor 26. The apparatus also includes a lower column 29 accommodating the steering operation shaft 20. The lower column 29 fits onto an upper end of the housing 25 at a lower end thereof. The apparatus also includes an upper column 30 accommodating the steering operation shaft 20, which is supported by the upper column 30. The upper column 30 fits onto the lower column 29 relative to which the upper column 30 is capable of displacement in an axial direction thereof.

The housing 25 is the stationary substance attached to a vehicle body. The housing 25 includes a circular tubular part 25b that surrounds the first rotating body 2 and the force transmitting shaft 21. The circular tubular part 25b has a connective cylinder part 25a at an upper end thereof. The housing 25 also includes an attachment seat 25c for attaching the holding ring 7 thereto. The attachment seat 25c is provided to project in a portion of an outer circumference of the circular tubular part 25b. The housing 25 also includes a through hole 25d penetrating the circular tubular part 25b in a radial direction thereof. The through hole 25d is rectangular in section to arrange the magnetic flux concentrating rings 5, 5 in the circular tubular part 25b. The housing 25 also includes an engagement groove 25e that communicates with the through hole 25d and bends corresponding to the ring part 71 of the holding ring 7. The attachment seat 25c is provided in two portions of the housing 25, which oppose the flanges 72c, 72c respectively. The two attachment seats 25c, 25c are provided with screw holes 25f, 25f respectively. The holding ring 7 attaches to the housing 25 by fitting tiny screws 12 into screw holes 25f, 25f after the tiny screws 12 are inserted into the insertion holes 72d, 72d of the flange 72c, 72c.

The connective cylinder part 25a locates near the through hole 25d. The bearing 22 fits inside the connective cylinder part 25a to be fixed thereon. The lower column 29 fits onto the connective cylinder part 25a to be fixed thereon.

There is a gap on the lower column 29 the upper end of which the upper column 30 embraces. In the gap, an impact energy absorbing member 31 is provided for absorbing secondary impact energy and has a tubular shape. The upper end of the upper column 30 holds a bearing 32 to be fitted therein that supports the steering operation shaft 20. Furthermore, an impact transmitting ring 33 fits on the steering operation shaft 20. The impact transmitting ring 33 comes into contact with an upper face of the bearing 32. The secondary impact energy, which is exerted to the steering operation shaft 20, is transmitted to the upper column 30 via the impact transmitting ring 33 and the bearing 32. The secondary impact energy is absorbed by the impact energy absorbing member 31 during displacement of the upper column 30 relative to the lower column 29 in the axial direction.

The circular tubular part 25b, the through hole 25d and the engagement groove 25e define a slot for accepting the holding ring 7 to be fitted into the housing 25. The ring part 71 of the holding ring 7 is inserted into the circular tubular part 25b through the through hole 25d which penetrates the circular tubular part 25b of the housing 25 in the radial direction. The magnetic flux concentrating rings 5, 5 are positioned in the circular tubular part 25b by engagement of the ring part 71 with the engagement groove 25e. The sealing ring 10 comes into contact with inner circumferential surface of the through hole 25d to seal. The flanges 72c, 72c of the holding ring 7 attaches onto the attachment seats 25c, respectively. After the attachment of the holding ring 7, the first rotating body 2 and the force transmitting shaft 21 are inserted into the circular tubular part 25b in the axial direction of the housing 25. The permanent magnets 41 and the magnetic ring 42 are arranged inside the magnetic flux concentrating rings 5, 5.

In addition, the steering operation shaft 20 includes an upper shaft 20a and a lower shaft 20b. The upper shaft 20a connects to the lower shaft 20b via an impact energy absorbing member 34 and is enabled to displace relative to the lower shaft in the axial direction. The secondary impact energy that is exerted to the upper shaft 20a is absorbed by the impact energy absorbing member 34 during displacement of the upper column 30 relative to the lower column 29 in the axial direction.

In the above-mentioned electric power steering apparatus, the both end faces of the holding ring 7 of the torque detecting device A in the axial direction are substantially parallel to each other. The fitting groove 73 is provided in the attachment portion 72b that includes the both end faces. The sealing ring 10 fits into the fitting groove 73. Due to the above-mentioned configurations, the sealing ring 10 can seal the attachment portion 72b of the holding ring 7 without a fitting groove for sealing in the through hole 25d of the housing 25. Further, since there can be no fitting groove for sealing in the through hole 25d of the housing, a distance H between an end of the housing 25 and a step portion of the housing 25 can be made short. The distance H is shorter than that of the conventional structure that the fitting groove is provided in the housing 25 and the sealing ring is sandwiched between the housing and the flange circumferentially provided corresponding to the sealing rings. Consequently, a displacement amount S (an energy absorbing stroke S) can be made long in the axial direction of the upper column 30 relative to the lower column 29. The amount S is longer than that of the conventional structure that the fitting groove is provided in the housing 25 and the sealing ring is held between the housing and the flange circumferentially provided corresponding to the sealing ring. Thus, safety in crash can be made higher in head-on crash of vehicles. Further, costs can be reduced since there is no need for providing the fitting groove for sealing in the housing 25, the costs including that of the housing 25 as well as the electric power steering apparatus.

It should be noted that, in the electric power steering apparatus, a rotation torque, which is exerted to the steering operation shaft 20 upon an operation of the steering operation member, is detected by the detecting part 6 based on torsion, which is generated in the torsion bar 1. After the detected torque is converted to voltage signals in the detecting circuit substrate 9, the signals are sent to the controlling part 28. The controlling part 28 outputs instruction signals for controlling driving of the electric motor 26. The electric motor 26 rotates the force transmitting shaft 21 via the reduction mechanism 27.

INDUSTRIAL APPLICABILITY

The torque detecting device A according to the present invention can be applied not only to electric power steering apparatuses but also to other apparatuses than the electric power steering apparatuses.

What is claimed is:

1. A torque detecting device comprising:
a housing that encloses the torque detecting device;
magnetic flux concentrating rings which locate outside of a circumference of a magnetic circuit forming member provided in a rotating body to which a torque is exerted, the rings concentrating a magnetic flux generated by the magnetic circuit forming member;
a detecting part which detects the torque exerted to the rotating body based on a density of the magnetic flux concentrated by the rings; and
the housing includes a holding ring which holds the magnetic flux concentrating rings and the detecting part and includes an attachment part, which attaches to a stationary substance, on an outer circumference of the holding ring, wherein
both end faces of the holding ring in an axial direction of the holding ring are parallel to each other,
the attachment part includes a fitting groove in which a sealing ring, which seals a gap between the attachment part and the stationary substance, fits, and
both end faces of the housing in the axial direction of the holding ring are flat except for position of the fitting groove, respectively.

2. The torque detecting device according to claim 1, wherein the attachment part is provided with a flange between the both end faces.

3. An electric power steering apparatus comprising:
a torque detecting device that comprises:
- a first housing that encloses the torque detecting device;
- magnetic flux concentrating rings which locate outside of a circumference of a magnetic circuit forming member provided in a rotating body to which a torque is exerted, the rings concentrating a magnetic flux generated by the magnetic circuit forming member;
- a detecting part which detects the torque exerted to the rotating body based on a density of the magnetic flux concentrated by the rings; and
- the first housing includes a holding ring which holds the magnetic flux concentrating rings and the detecting part and includes an attachment part, which attaches to a stationary substance, on an outer circumference of the holding ring, wherein
- both end faces of the holding ring in an axial direction of the holding ring are parallel to each other,
- the attachment part includes a fitting groove in which a sealing ring, which seals a gap between the attachment part and the stationary part, fits, and
- both end faces of the first housing in the axial direction of the holding ring are flat except for positions of the fitting groove, respectively;

a second housing, as the stationary substance, which includes a through hole penetrating a circular tubular part, which accommodates the rotating body to fix the electric power steering apparatus, in a radial direction and allows the holding ring to be fitted through the through hole therein, the attachment part attaching to the second housing;

a steering operation shaft which connects to the rotating body;

a controlling part which drives an electric motor for assisting a steering operation, based on the torque detected by the torque detecting device; and a reduction mechanism which transmits a rotating force of the electric motor to a steering mechanism.

4. The electric power steering apparatus according to claim 3, further comprising:
- an upper column which connects to a steering operation member; and
- a lower column which fits to the upper column relative to which the lower column is capable of displacement in an axial direction thereof, a lower end of the lower column fitting to one end of the second housing to be fixed, wherein
- the upper column and the lower column accommodate the steering operation shaft.

* * * * *